United States Patent [19]
Gneiding et al.

[11] Patent Number: 5,181,977
[45] Date of Patent: Jan. 26, 1993

[54] TIRE INFLATION VALVE HAVING OVERPRESSURE AND FLOW CONTROL

[75] Inventors: Donald R. Gneiding, Fullerton; Oscar J. Peterson, Orange, both of Calif.

[73] Assignee: Circle Seal Controls, Inc., Anaheim, Calif.

[21] Appl. No.: 699,477

[22] Filed: May 13, 1991

Related U.S. Application Data

[63] Continuation of Ser. No. 547,536, Jun. 29, 1990, abandoned, which is a continuation of Ser. No. 242,477, Sep. 9, 1988, abandoned.

[51] Int. Cl.$^5$ ............................................. B60C 23/00
[52] U.S. Cl. .................................. 152/429; 152/427; 137/224; 137/226
[58] Field of Search ............... 152/415, 417, 427, 428, 152/429; 137/224, 226

[56] References Cited

U.S. PATENT DOCUMENTS 4,678,017 7/1987 Schultz .............................. 152/415
4,744,399 5/1988 Magnuson et al. ................. 152/415

Primary Examiner—Michael W. Ball
Assistant Examiner—Francis J. Lorin
Attorney, Agent, or Firm—Pillsbury Madison & Sutro

[57] ABSTRACT

A tire fill valve having pressure relief and tire fill fluid gas flow limiting characteristics for use in filling tires to a predetermined pressure form a large flow capacity gas source delivering fill gas at a substantially greater pressure. Gases utilized typically are air or nitrogen. The valve of the invention is wheel mounted intermediate the gas pressurizing source and the tire gas valve inlet. Tire fill gas from a high pressure high capacity source passes through a flow limiting orifice having a positive closure or shutoff member and passes through a pressure sensitive chamber as it enters the tire. Chamber pressure is sensed by a spring loaded valve disk controlling relief or venting orifices. When fill pressure in the pressure sensing chamber exceeds a pre-determined value established by the valve disk area and valve disk springs, the disk lifts allowing the venting of the fill gas. Overpressurization of the pressure sensitive chamber and tire with the disk in its relief position is prevented by limited flow and/or positive shutoff through the chamber entrance or flow limiting orifice.

20 Claims, 2 Drawing Sheets

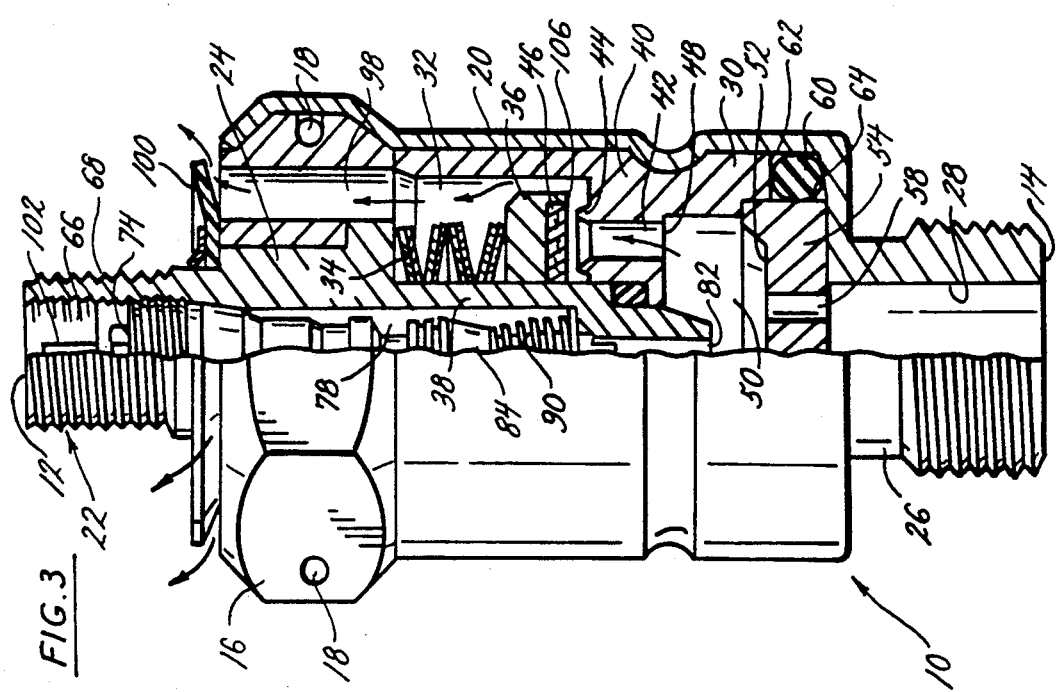
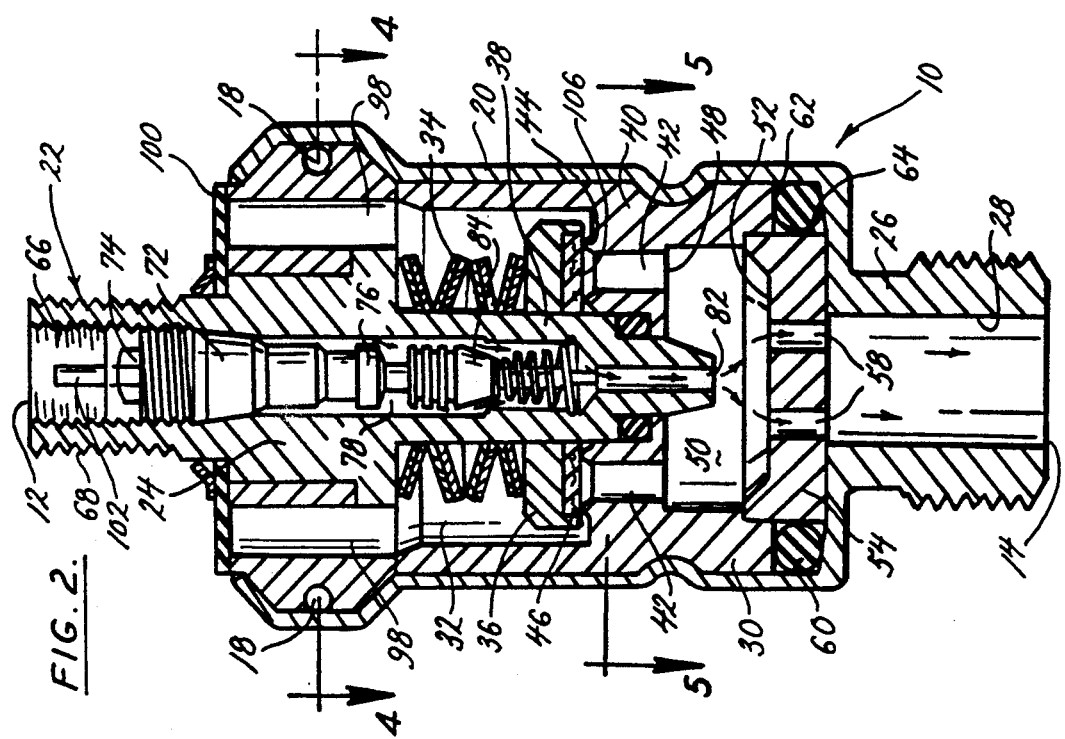

TIRE INFLATION VALVE HAVING OVERPRESSURE AND FLOW CONTROL

This is a continuation of copending application Ser. No. 07/547,536 filed on Jun. 29, 1990 which is a continuation of Ser. No. 07/242,477 filed Sep. 9, 1988 both abandoned.

BACKGROUND OF THE INVENTION

Maintenance of adequate pressure in pneumatic tires is acknowledged as a critical requirement. In particular, high performance tires used on the wheels of modern aircraft of large size and heavy weight, which land at high speeds have a critical requirement for accurate tire pressure.

In practice, in the maintenance of aircraft and other vehicles employing pneumatic tires such as highway trucks, and off the road vehicles, it is difficult and in some cases impossible to provide a regulated source of pressurizing gas to prevent over inflation. Also, high performance tires are often inflated with nitrogen in order to reduce the oxidation of such tires at high temperatures. Nitrogen is further preferred because of the relatively large size of its molecule, in comparison to the other constituents of air, which reduces tire leakage. A convenient and economic source of nitrogen is a high pressure tank wherein the delivered nitrogen is regulated from a typical tank pressure of 3,000 P.S.I.G., down to a tire delivery pressure, which typically is 300 P.S.I.G.

However, conventional tank regulators are often inaccurate in regulated output pressure, or fail to control delivery flow, or in many cases limit the delivery flow to low values that result in excessive inflation time. Also in many cases, it is exigent to utilize unregulated sources, such as secondary tanks filled to an intermediate pressure from a primary source. These secondary tanks are in common use and are economical, convenient and normally do not have an attached regulator. Tire filling or pressurization from an unregulated, secondary tank is essentially a cut and try operation. The usual technique involves approaching a desired pressure by gauging and filling in small steps. Since individual filling steps are by "feel", over pressurization can easily occur.

The avoidance of over pressurization is critical because it can cause excessive tire wear, loss of structural integrity and in extreme cases explosive failure. In many cases these explosions have caused serious injury and death to attending personnel. Unfortunately, the correct inflation pressure varies from vehicle to vehicle, and varies with location on a vehicle. Therefore, if a regulator is present on the pressure source, it constantly must be adjusted. Every time a regulator is adjusted, there is a chance that it will be improperly adjusted.

In view of the above mentioned difficulties, it is desireable to provide means to accurately regulate flow and delivery pressure for each individual tire. In this way correct inflation is assured.

These difficulties including safety related difficulties encountered with presently used tire pressurizing valves are overcome through the use of Applicants' invention. As disclosed, Applicants' invention provides a small, light weight and economical self-contained pressure and flow limiting valve as a replacement for the conventional tire valve. In use, the valve of the invention provides pressure relief and limits flow there through when in the relief position through positive shutoff, providing a convenient means for rapidly maintaining tire pressure from unregulated sources.

It is therefore an object of this invention to provide a pneumatic tire pressurization valve incorporating pressure relief at a predetermined pressure setting along with further overpressure protection through flow limiting and positive shutoff of the pressurizing gas when the valve is in its relief position.

It is an additional object of this invention to provide a pneumatic tire fill valve having size, weight, and cost features which allow permanent mounting on individual tires, thereby providing automatic control of tire pressurization without the need for a separate tire gauging operation.

It is a further object of this invention to provide a small, lightweight and economically designed tire fill valve directly replacing the individual original tire valve, wherein correct tire pressure can be assured even when the tire fill gas source is of substantially greater pressure and flow capacity than the tire and the valve respectively.

It is yet an additional object of this invention to reduce the danger to maintenance personnel, engaged in pressurizing a high pressure pneumatic tire from a source having excessive pressure and flow capacity, through the use of a pressure and flow limiting valve continuously attached to the tire.

SUMMARY OF THE INVENTION

The invention disclosed herein is a small, lightweight, economical tire fill valve of such size and weight that it can be permanently attached to the rim of a tire wheel having a pneumatic tire mounted thereon. Pressurizing gas from a source of high pressure and/or high flow capacity is admitted at the inlet of the valve through the usual spring loaded poppet type inlet valve, commonly known to the pneumatic industry as a Schrader valve. Pressurizing gas, which is admitted through the Schrader valve by the depression of its inlet or operating rod by a typical air chuck, passes through a flow limiting orifice containing a flow actuated poppet before entering a pressure sensitive chamber. The pressure sensitive chamber is in constant fluid communication with the tire interior. Also in fluid communication with the pressure sensitive chamber via a multiplicity of orifices having a semicircular segmental cross section, is a valve disk. The valve disk cooperates with a valve seat to normally seal an exhaust passage. The valve disk is force biased against the valve seat by a series of spring washers which produce a preload force. The spring washers having a limited travel also limit lifting travel of the valve disk at a predetermined chamber pressure.

When the pressure sensitive chamber reaches a pressure wherein the valve disk force approaches that of the spring washers, vertical movement or lifting of the valve disk allows gas flow from the chamber to exit the valve through an additional multiplicity of segmental relief passages and/or vents arranged in a circular pattern circumferential of the inlet valve.

In operation, as the tire pressure reaches the value determined by the force balance system, consisting of the valve disk and the spring washers, any increase in tire pressure above a predetermined value is prevented by disc lift and venting of the fill gas. In cases where gas sources having extremely high gas delivery are in use, overpressurization of the pressure sensitive chamber is prevented since excess flow through the flow limiting orifice is prevented by positive shutoff of flow sensitive poppet contained in the flow limiting orifice.

BRIEF DESCRIPTION OF THE DRAWINGS

Other objects and advantages of the invention will become apparent upon reading the following detailed description and indicated reference to the drawings, in which:

FIG. 2 is a cross-sectional view of the valve of the invention along the line 2—2 of FIG. 1 (inlet cap omitted). FIG. 2 particularly shows the valve of the invention in its tire fill and non-relief position.

FIG. 3 is a partial section at the line 2—2 of FIG. 1, showing the valve of the invention in overpressure and overflow relief position, particularly showing the flow sensitive poppet in positive shutoff.

While the pneumatic pressurization valve of this invention will be described in connection with a preferred embodiment, it is understood that the preferred embodiment is not intended to limit the invention to that embodiment. On the contrary it is intended to cover all alternatives, modifications, and equivalents as may be included within the spirit and scope of the invention as defined by the appended claims.

DETAILED DESCRIPTION OF THE INVENTION

Figure 1:
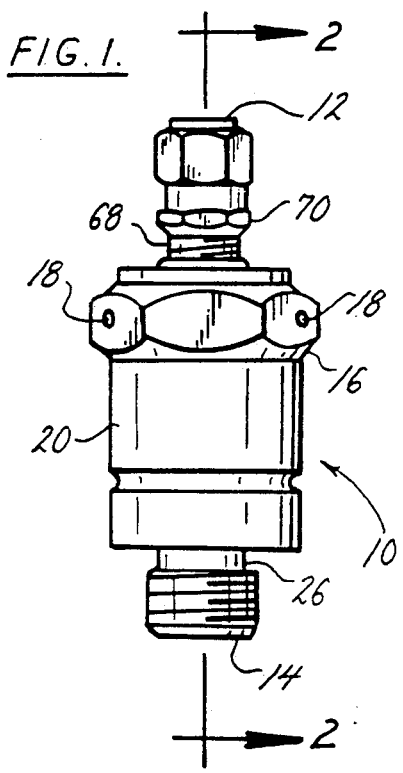
FIG. 1 is a side view of the finished valve, shown essentially full size. In particular, the upper or inlet valve, and the lower or tire attachment adapter are shown along with a hexagonal installation shoulder.
Figure 4:
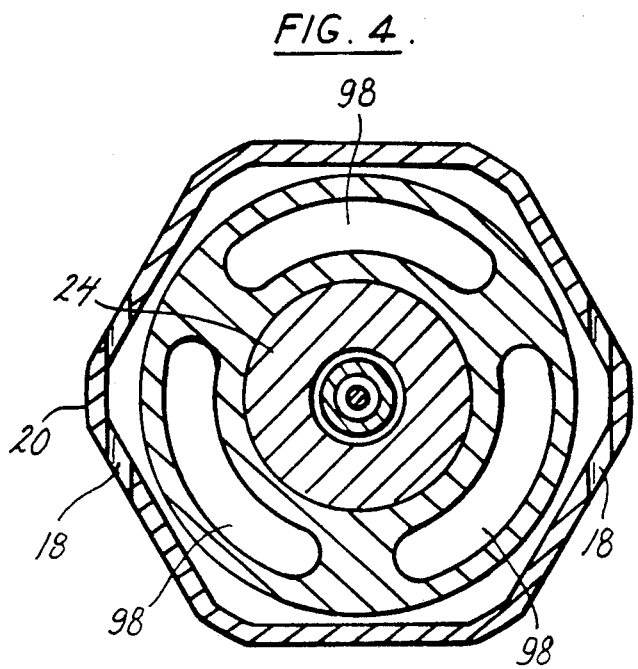
FIG. 4 is an additional section along the line 4—4 of FIG. 2, particularly showing the semi-circular segmented or arcuate upper relief passages of the valve of the invention.

With particular reference to FIGS. 1 and 2, there is shown a pressure and flow relieving tire inflation or pressurization valve 10 of the invention having a gas pressurization inlet 12 and a tire adapter and outlet end 14. The valve 10 also incorporates a hexagonal portion 16 having safety or retention wire holes or ports 18 in keeping with commonly used wire antiturn techniques in use in the aircraft and/or automotive industries.

With particular reference to FIG. 2, the tire pressurization and relief valve 10 includes an outer shell or housing 20. Internal of the outer shell or housing 20 at its inlet end 22 is the hexagonal portion 16 suitable for proper installation, and a gas inlet adapter 24. The outer shell 20 further includes at its outlet end 14, a threaded outlet or tire adapter 26 having an outlet port 28 suitable for direct mounting on the rim inlet of the wheel mounting a pressurized pneumatic tire (not shown). Intermediate of the outlet port 28 and gas inlet adapter 24 is a valve spool 30 incorporating a spool spring chamber and/or relief passage 32 that contains an annular spring and/or spring washers 34 and an annular valve disk 36. The spring washers 34 and valve disk 36 are concentric with and circumferentially disposed around a lower cylindrically shaped portion 38 of the gas inlet adapter 24.

A lower portion 40 of the valve spool 30 further incorporates a plurality of segmental, semi-circular flow passages or orifices 42 each having a raised lip seat 44 facing a concentric valve disk seal 46 for sealing cooperation therewith.

The lower ends 48 of the lower relief passages 42 defined by the valve spool 30 terminate in a pressure sensing chamber 50 further defined by the lower portion 40 of the valve spool 30 and the upper surface 52 of a deflector disk 54. The upper surface 52 of the deflection disk 54 forms the lower surface of the pressure sensing chamber 50 and includes tire fill ports 58 passing therethrough. The fill ports 58 fluid communicate the pressure sensing chamber 50 and the interior of the tire to be filled via the valve outlet port 28. A suitable pressure seal 60 is positioned between the valve housing 20 and the lower corners 62 and 64 of the valve spool 30, and deflector disc 54 respectively.

As indicated above, internal and of surrounded by the hexagonal portion 16 and valve spool 30 is a gas inlet adapter 24. The adapter 24 includes a valve inlet port 66 having external threads 68 for incorporation of a dust cover or additional leak preventing cap 70 (reference FIG. 1). The inlet port 66 threadably engages a tire fill valve 72 of a conventional type, commonly known as a "Schrader" valve having its inlet 74 adjacent the inlet port 66 and its outlet 76 internal of the gas inlet adapter flow passage or cavity 78. The lower end 80 of the flow passage 78 defines and/or is terminated by a control orifice 80 so that gas pressure communicates between the passage or cavity 78 and the pressure sensing chamber 50.

Figure 6:
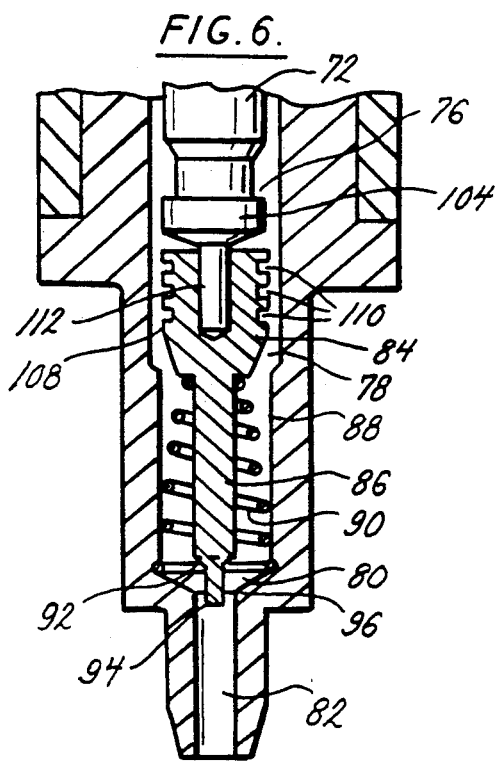
FIG. 6 is a partial enlarged section of the valve of the invention along line 2—2 of FIG. 1, particularly showing the gas inlet adapter and flow sensitive poppet, in a fill and non-relief position.
Figure 5:
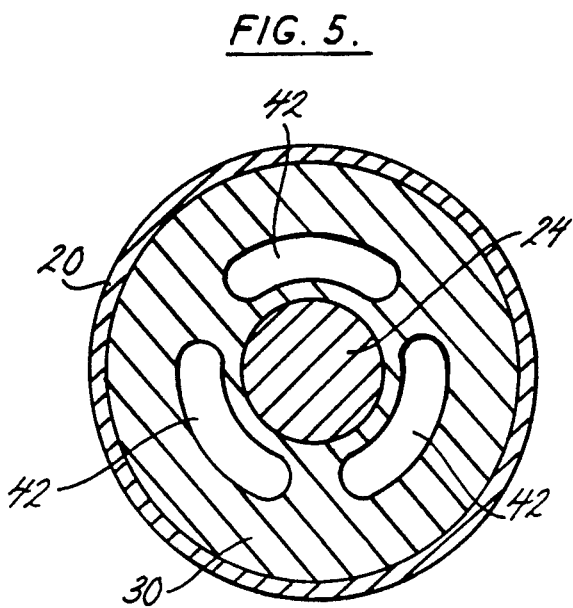
FIG. 5 is a section of the valve of the invention along the line 5—5 of FIG. 2, particularly showing the semicircular segmented or arcuate lower relief ports.

As shown in FIG. 6, a flow sensitive poppet 84 is mounted in the flow passage 78. The poppet stem 86 is centrally maintained in longitudinal alignment with the lower base 88 of the inlet adapter passage 78. A conical spring 90 provides alignment and vertical preload force to the poppet 84, maintaining the poppet closure end 92 with its alignment pin 94 above a cooperating seat 96.

Also internal of the housing hexagonal portion 16 is a plurality of concentrically disposed fill gas exit ports 98 each having a semi-circular arc like cross section. The exit ports 98 fluid communicate the spool spring chamber 32 with ambient air. An annular circular dust cover 100 of flexible elastomeric material such as natural rubber or neoprene provides protection to the ports 98 from external contamination, readily allowing venting of the pressurizing gas during relief operation of the valve 10.

In operation, gas from a high pressure and/or high capacity source is introduced through a conventional air chuck (not shown) having a deflector tongue for depressing the inlet or Schrader valve actuating pin 102. As those skilled in the art will readily recognize, operation of the Schrader valve 72 is such that depressing the pin 102 moves the lower member or poppet 104 vertically downwardly, opening a concentric port (not shown) internal of the Schrader valve 72, and admitting pressurized fill gas to the upper end of gas inlet adapter flow passage or chamber 78. Under fill conditions at pressures below valve calibration as shown in FIG. 2, the pressurization gas flows through the chamber 78, seat 96, and the flow control orifice 82 into the pressure sensing chamber 50 through the tire fill ports 58 and into the tire to be inflated through the outlet port 28.

At the completion of the filling process, or for any other reason when the pressure in chamber 50 reaches a value which acts on the underside 106 of the valve disk 36 via the orifices 42 in the valve spool 30 to exceed the predetermined preload of the spring washers 34, the disk 36 lifts, as indicated in the right-half portion of FIG. 3, allowing relief flow of the pressurizing gas to exit the valve 10 via the spring chamber 32 and exit ports 98. As discussed above, the flexible dust cover 100 is easily deflected by the exiting gas and as shown in the right-half of FIG. 2, allows easy venting. Venting of the fill gas under relief conditions limits the pressurization of the tire being filled to a predetermined value. Typically, fill pressure is limited to 300 P.S.I.G. and hence the pressure causing lifting of the disk 36 is 300 P.S.I.G.

A highly important feature of the disclosed invention arises from the fact that under conditions where the fill source pressure and/or capacity for one reason or another is a multiple or even an order of magnitude greater than the desired tire maximum, venting of a conventional relief device would still result in over pressuring of the tires since the restricted flow through the exit ports 98 would not limit the pressure possible in the chamber 50 sufficiently to prevent overpressure from existing at the tire inlet or valve outlet port 28. However, Applicants have discovered that inclusion of the flow sensitive poppet 84, maintained in an open or flowing position as shown in FIGS. 2 and 6, where the poppet 84 is maintained away from the valve seat 96 by the preload or bias force of the conical spring 90, controls tire filling gas flow through said seat 96 for both relief and normal flow conditions of the valve 10.

In operation, should fill pressure in chamber 50 exceed a predetermined relief pressure, venting fill gas through ports 98 reduces filling gas pressure entering the tire at the outlet port 28. However if the pressure differential between the poppet 84 and the outlet port 28 is too high, venting through ports 98 may be insufficient to hold the pressure in chamber 50 below a predetermined value, typically 20% in excess of the desired tire pressure. In this instance, the poppet 84 contained in the flow passage 78 of the gas inlet adapter 24, moves downwardly due to the flow induced pressure drops across the poppet head 108, thereby contacting the seat 96 and reducing the pressure within the chamber 50 and the flow into the tire through the outlet port 28. Control of the downward motion of the poppet 84 and the quantity of flow past the seat 96 is aided by the flow drag of peripheral grooves 110 in the poppet head 108. An alignment pin 112 extending from the poppet 104 into the poppet head 108 centers the head 108 in the flow passage 78.

Thus it is apparent that there has been provided in accordance with the invention the tire fill valve that fully satisfies the objects, aims and advantages as set forth above. While the tire fill valve disclosed here has been described in conjunction with specific embodiments thereof, it is evident that in the alternatives modifications end variations will be apparent to those skilled in the art in the light of the foregoing description. Accordingly it is intended to embrace all such alternatives, modifications and variations as fall within the spirit and broad scope of the appended claims.

Therefore I claim:

1. A wheel mounted gas fill valve for pressurizing a pneumatic tire above ambient pressure having:
   a valve housing;
   an inlet gas passage in said housing having:
      a first end adapted for admitting pressurizing gas from a high pressure gas source; and
      a second end;
   an inlet Schrader valve in said second end of said inlet gas passage oriented to normally block flow from said second end to said first end unless mechanically opened;
   an outlet port in said housing distal said inlet gas passage, adapted for connection to a tire for supplying pressurized gas to the tire;
   a flow limiting orifice in flow communication with said inlet gas passage;
   a pressure sensing cavity in said housing, said cavity communicating said flow limiting orifice and outlet port;
   valve means capable of venting said pressure sensing cavity to ambient; and
   means responsive to a predetermined difference in pressure between ambient pressure and pressure in said pressure sensing cavity to open said valve means, whereby pressure in said pressure sensing cavity in excess of a predetermined absolute value above ambient pressure is limited so that gas pressure at said outlet port is limited to a predetermined maximum pressure above ambient no matter what pressure is present at said inlet passage.

2. The gas fill valve of claim 1 wherein said flow limiting orifice further comprises:
   a flow sensitive poppet;
   an exit end distal said inlet valve;
   a seat; and
   means mounting said poppet for reciprocal motion, said mounting means allowing gas flow through said flow limiting orifice for gas flows below a predetermined value, and said poppet and seat cooperating to restrict flow through said orifice for gas flow through said passage in excess of a predetermined value, whereby excess pressurizing gas flow into said tire is prevented.

3. A compact tire fill valve with overpressure relief including:
   a valve body having:
      a first end; and
      an opposite second end;
   an inlet port positioned at said first end of said valve body and adapted for pneumatic connection to a high pressure gas source by means of a removable chuck;
   a first outlet port positioned at said second end of said valve body and adapted for pneumatic connection to a tire having:
      a plurality of first outlet port orifices therein having a total flow cross-section of a fixed amount;
   a poppet valve sealably positioned in said inlet port to normally allow pressurized gas to pass from said first end toward said second end;
   a pressure sensing chamber positioned between said poppet valve and said first outlet port;
   flow restricting means positioned between said poppet valve and said pressure sensing chamber having a maximum flow path cross-section of a predetermined amount which is less than said total fixed amount of flow cross-section of said plurality of first outlet port orifices;
   a plurality of second outlet ports in pneumatic connection to atmospheric pressure, said second outlet ports being concentrically positioned around said poppet valve and being larger in total cross-sectional area for flow than said total fixed amount of flow cross-section of said plurality of first outlet port orifices;

a relief ring having:
  a first radial side in pneumatic connection to said plurality of second outlet ports; and
  a second opposite seal radial side;
compression spring means positioned to apply a predetermined force to said first radial side of said relief ring; and
a plurality of orifices extending from said pressure sensing chamber to said second seal radial side of said relief ring that is forced into sealing contact therewith by said compression spring, whereby a pressure in said pressure sensing chamber predetermined by said predetermined force, moves said relief ring away from said plurality of orifices to relieve pressure therewithin through said plurality of orifices and said second outlet ports to the atmosphere.

4. The valve as defined in claim 3 wherein each of said plurality of second outlet ports have:
  a first end in pneumatic connection to said to said first radial side of said relief ring; and
  a second end exposed to the atmosphere, said valve further including:
    a ring shaped flapper covering said second ends of said plurality of second outlet ports to prevent debris from entering said second outlet ports.

5. The valve as defined in claim 3 wherein said flow restricting means include:
  a restriction chamber adjacent said poppet valve; and
  a restriction passageway which connects to said pressure sensing chamber.

6. The valve as defined in claim 5 wherein said flow restricting means also include:
  a spring loaded movable restriction member located in said restriction chamber, said movable restriction member being responsive to flow velocities therepast to move toward said flow restriction passageway in response to high flow velocities of gas passing toward said pressure sensing chamber to further restrict gas flow in response thereto.

7. The valve as defined in claim 6 wherein said flow restricting means also include:
  a nipple having a cylindrical outer surface and in which said restriction chamber is formed, said relief ring being positioned on said cylindrical outer surface for longitudinal sliding thereon in response to overpressures in said pressure sensing chamber.

8. The valve as defined in claim 7 wherein said second opposite seal radial side of said relief ring includes:
  a seal ring positioned thereon facing said plurality of orifices to form a releasable seal therewith.

9. The valve as defined in claim 8 wherein said plurality of orifices each include:
  a circular lip thereabout facing said seal ring for sealing contact therewith.

10. The valve as defined in claim 9 wherein said second opposite seal radial side of said relief ring includes:
  a ring shaped lip positioned to restrict outward radial movement of said seal ring.

11. The valve as defined in claim 10 wherein said poppet valve is a Schrader type valve.

12. The valve as defined in claim 3 wherein said second opposite seal radial side of said relief ring includes:
  a seal ring positioned thereon facing said plurality of orifices to form a releasable seal therewith.

13. The valve as defined in claim 12 wherein said plurality of orifices each include:
  a circular lip thereabout facing said seal ring for sealing contact therewith.

14. The valve as defined in claim 12 wherein said second opposite seal radial side of said relief ring includes:
  a ring shaped lip positioned to restrict outward radial movement of said seal ring.

15. A compact tire fill valve with overpressure relief including:
  a valve body having:
    a first end; and
    an opposite second end;
  an inlet port positioned at said first end of said valve body and adapted for pneumatic connection to a high pressure gas source;
  a first outlet port positioned at said second end of said valve body and adapted for pneumatic connection to a tire, said first outlet port having:
    at least one first outlet port orifices therein having a total flow cross-section of a fixed amount;
  a poppet valve sealably positioned in said inlet port which in response to differential pressure thereacross normally allows gas to pass from said first end toward said second end and allows gas to pass in the opposite direction only in response to a mechanical input thereto;
  a pressure sensing chamber positioned between said poppet valve and said first outlet port;
  flow restricting means positioned between said poppet valve and said pressure sensing chamber having a maximum flow path cross-section of a predetermined amount which is less than said total fixed amount of flow cross-section of said at least one first outlet port orifices;
  at least two second outlet ports in pneumatic connection to atmospheric pressure, said second outlet ports being concentrically positioned around said poppet valve and being larger in total cross-sectional area for flow than said total fixed amount of flow cross-section of said at least one first outlet port orifices;
  a relief ring having:
    a first side in pneumatic communication to said plurality of second outlet ports; and
    a second opposite radial side;
  spring means positioned to apply predetermined force to said first side of said relief ring toward said second end of said valve body; and
  at least two orifices extending from said pressure sensing chamber to said second radial side of said relief ring that is forced into sealing contact therewith by said compression spring, whereby a pressure in said pressure sensing chamber predetermined by said predetermined force, moves said relief ring away from said at least two orifices to relieve pressure therewithin through said at least two orifices and said second outlet ports to the atmosphere.

16. The valve as defined in claim 15 wherein said flow restricting means include:
  a restriction chamber; and
  a restriction passageway which pneumatically connects said restriction chamber to said pressure sensing chamber.

17. The valve as defined in claim 16 wherein said flow restricting means also include:
  a spring loaded movable restriction member located in said restriction chamber, said movable restriction member being responsive to flow velocities therepast to move toward said flow restriction passageway in response to high flow velocities of gas passing toward said pressure sensing chamber to further restrict gas flow in response thereto.

18. The valve as defined in claim 17 wherein said flow restricting means also include:
a nipple having a cylindrical outer surface and in which said restriction chamber is formed, said relief ring being positioned on said cylindrical outer surface for longitudinal sliding therealong in response to overpressures in said pressure sensing chamber.

19. The valve as defined in claim 18 wherein said second opposite radial side of said relief ring includes:
a seal member positioned thereon facing said at least two orifices to form a releasable seal therewith.

20. The valve as defined in claim 19 wherein said at least two orifices each include:
a circular lip thereabout facing said seal member for sealing contact therewith.

* * * * *